Aug. 23, 1938.  J. H. STALEY  2,127,760
SELECTIVE ACTUATOR FOR MERCURY SWITCHES
Filed Nov. 1, 1937  2 Sheets-Sheet 1
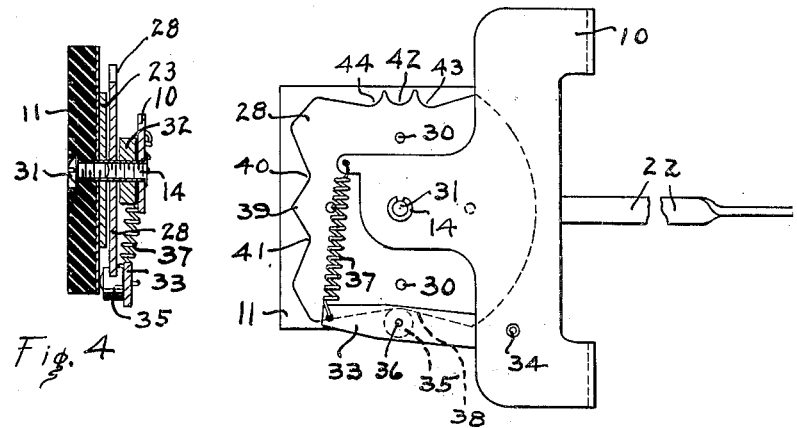
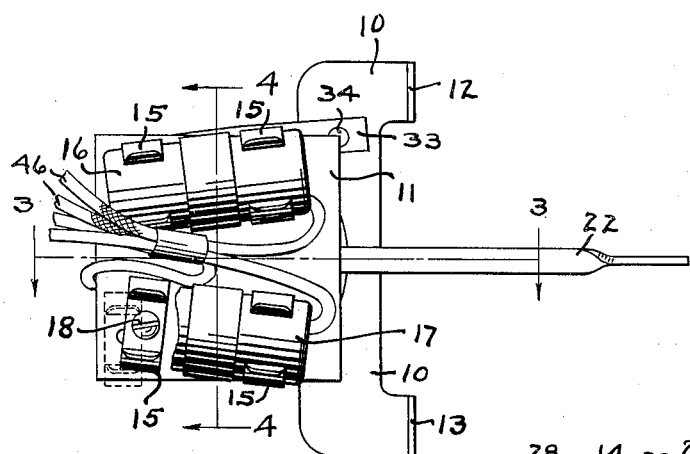
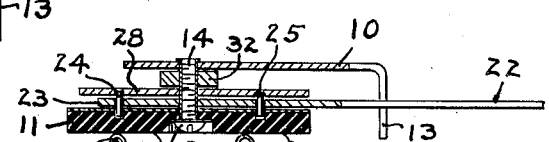
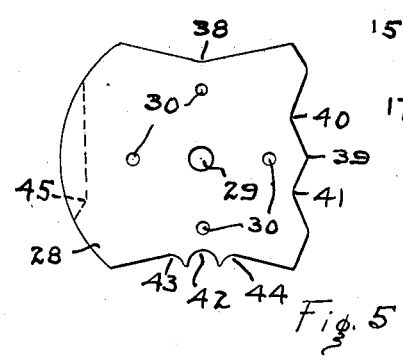
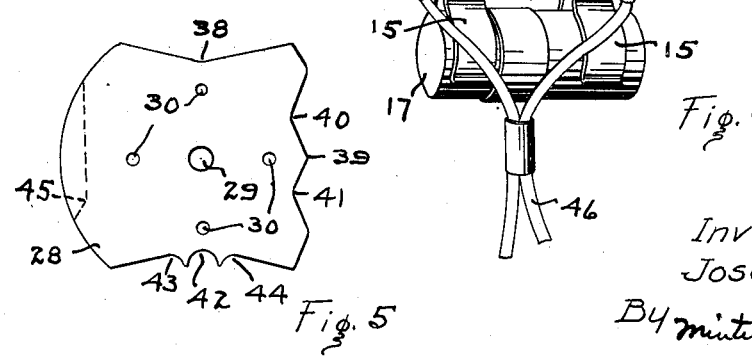
Inventor
Joseph H. Staley
By Minturn & Minturn
Attorneys Aug. 23, 1938.  J. H. STALEY  2,127,760
SELECTIVE ACTUATOR FOR MERCURY SWITCHES
Filed Nov. 1, 1937  2 Sheets-Sheet 2

Inventor
Joseph H. Staley,
By Minturn & Minturn
Attorneys

Patented Aug. 23, 1938

2,127,760

UNITED STATES PATENT OFFICE 2,127,760

SELECTIVE ACTUATOR FOR MERCURY SWITCHES

Joseph H. Staley, Columbus, Ind., assignor to Electric Switch Corporation, Columbus, Ind.

Application November 1, 1937, Serial No. 172,188

10 Claims. (Cl. 200—152)

This invention relates to means for rocking mercury switches and has for its primary object the provision for an extremely simple yet effective operating mechanism that will give a wide range of selective actions on the switch.

Figure 6:
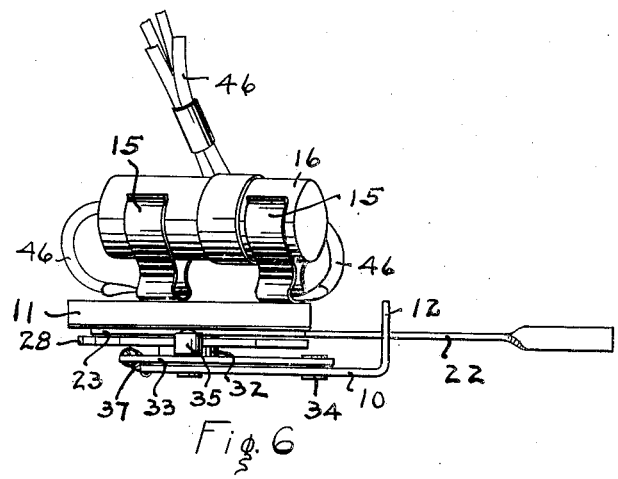
Figure 7:
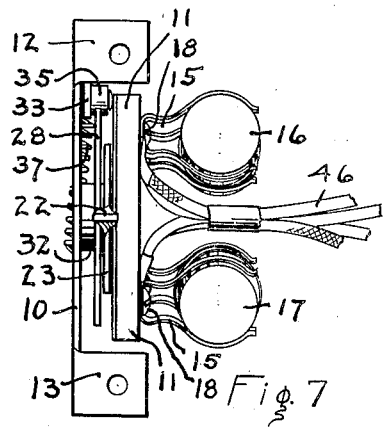

These and other objects and advantages of the invention will become apparent to those versed in the art in the following description of one particular form of the invention as illustrated in the accompanying drawings, in which Fig. 1 is a front side elevation of a structure embodying the invention;

Fig. 2 a rear elevation;

Fig. 3 a central horizontal section on the line 3—3 in Fig. 2;

Fig. 4 a detail in vertical section with the switches removed on the line 4—4 in Fig. 1;

Fig. 5 a detail in elevation of the cam plate;

Fig. 6 a top plan view of the structure;

Fig. 7 an end elevation; and

Figure 8:
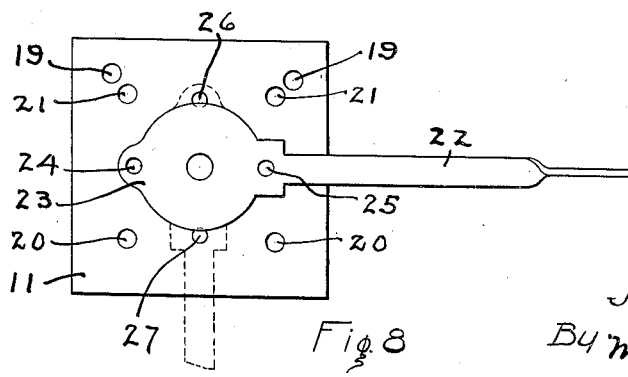

Fig. 8 a detail in rear elevation of the mounting of the operating lever.

Like characters of reference indicate like parts throughout the several views in the drawings.

A suitable mounting bracket 10 is provided on which a switch carrying base 11 may be rockably mounted. In the form herein shown, this bracket 10 takes the form of a metal plate having mounting legs 12 and 13 and having a central portion extending rearwardly to receive a base attaching sleeve 14. The exact form of this bracket 10 is immaterial to the invention and may vary in different installations.

The base 11 carries on its side removed from the bracket 10 a number of switch receiving clips 15 here shown as four in number arranged in pairs to receive two mercury switches 16 and 17. The type of switches 16 and 17 here shown are of the metal wall type whereby electrical connection is made directly from the wall of the switch through the respective clips. It is obvious that in other types of switches, electric connections may be carried from the usual leads without having to employ the clips 15 in the electrical circuit. However, in the particular form herein shown, the base 11 is preferably made of any suitable insulating material and the clips 15 are secured thereto directly by means of screws 18, one for each clip, pass through the central portion of the clip and screwthreadedly engage in the base 11.

It is to be noted that the angularity of either or both switches 16 and 17 may be varied by shifting one or both of the clips 15 in each pair from the horizontal central line of the base 11. As indicated in Fig. 1, the lower rear clip 15 may be shifted to the dash line position to shift switch 16 initially mounted parallel with the horizontal line in the base 11. This shifting is permitted by reason of the fact that the base carries a second hole 19, Fig. 8, into which the screw 18 may screwthreadedly engage to position the clip 15 in the changed position. In other words, Fig. 8, the base 11 is symmetrically formed to have on each side of its horizontal central line a pair of holes 20 and 21 receiving the screws 18 of the mounting clips in lines inclined to that central line, and in addition the base 11 carries the additional auxiliary holes 19 to permit a shifting of the outer clips into the parallel relation.

An operating lever 22 is formed to have a base engaging end 23, the central portion of which loosely fits around the sleeve 14. This end 23 carries a pair of pins 24 and 25 diametrically spaced in equal distance from the center of the axis of the sleeve 14 and extending from both faces of the lever end 23, Fig. 3. These extending ends of the pins 24 and 25 fit into bores provided in the base 11 whereby rocking of the lever 22 will cause corresponding rocking of the base 11. In order to provide for a range of positions of the lever 22 to meet the requirements of various installations, the base 11 is provided with an additional set of bores 26 and 27, Fig. 8, positioned 90 degrees from the first set so that the lever 22 may be mounted on the base 11 in any one of four positions simply by lifting the lever end 23 to disengage the pins 24 and 25 from one set of bores and shifting the end around and seating the pins in the selected set to give the direction of the lever as desired.

A cam plate 28 is provided to fit against the side of the lever end 23, rockably engaging over the sleeve 14 by a central hole 29. The cam plate 28 is interengaged with the lever end 23 by means of the pins 24 and 25 extending into the holes 30 suitably spaced on the plate. The plate 28 in the form herein shown is provided with two sets of these holes 30 whereby the plate 28 may be mounted over the lever end 23 in any one of four positions simply by lifting the plate 28 up off the pins 24 and 25 and revolving the plate relative to the end 23, 90 degrees, 180 degrees, or 270 degrees, to give the position of the cam as desired for the particular action wanted in circuit control through the switches 16 and 17.

To complete the mounting of the parts so far described, a screw 31 slidably passes centrally through the base 11 to have its head seated in a recess formed therein and to have its shank screwthreadedly engage within the bore of the sleeve 14. The sleeve 14 is formed with an external head engaging the outer side of the bracket 10 and the length of the sleeve 14 serves as spacing means to rock the base 11 in reference to the bracket 10. In order to prevent binding, a suitable spacer washer 32 is interposed between the cam plate 28 and the bracket 10 whereby the plate 28 is held in fixed relation to the lever end 23 and the lever end 23 is in turn held in fixed relation on the base 11, but at the same time permitting rocking of the base 11 and the cam plate upon rocking of the lever 22 about the sleeve 14. By rocking the lever 22, the switches 16 and 17 are correspondingly rocked to cause the mercury inside thereof to flow from one end to the other in each switch and thereby set up corresponding circuit closing and opening conditions. The switches 16 and 17 may be of the type shown in my United States Letters Patent No. 1,940,028 issued December 19, 1933, whereby flow of mercury to one end of the switch upon tilting will open the circuit between the cap end and the body end and upon tilting in the opposite direction will cause the mercury to flow to bridge the cap and body to complete the circuit.

The cam plate 28 may be formed to have a contour to give a wide range of action of the switches upon movement of the lever 22. A rocker arm 33 is rockably mounted on the bracket 10 on a pivot 34 to swing in parallel relation with the base 11. On this arm 33 is mounted a roller 35 on the pivot pin 36. The roller 35 is in the path of the contour of the cam plate 28 and is normally pulled against the cam plate by means of a spring 37 secured by one end to the outer end of the arm 33 and by its other end to the bracket 10, Fig. 2.

In the form of the cam plate 28 herein shown, and in the position indicated, Fig. 5, the upper edge of the plate is formed to have a wide V-like depression 38, in the center of which the roller 35 normally rests. By pushing up or down on the lever 22, the switches 16 and 17 may be rocked accordingly but when the switch lever 22 is released, the switches 16 and 17 will be returned to their normal initial positions by reason of the spring 37 urging the cam plate 28 back to the normal position to permit the roller 35 to rest in the bottom of the notch 38. The rear edge of the cam plate is formed in a different manner to have a central protruding shoulder 39 with depressions 40 and 41 on the respective sides thereof. By turning the cam plate 28 around over the lever end 23 to bring this rear edge into the path of the roller 35, the roller will normally rest in either one of the depressions 40 or 41 depending upon how the lever 22 is shifted. In either case, it is to be noted that the switches 16 and 17 will then be held in either an extreme upwardly rocked position or an extreme lower rocked position and will not normally come to rest in the central position since the projecting shoulder 39 will not permit the roller 39 to remain at rest thereon.

The underside of the cam plate 28 is held shown as being provided with a still further modified contour in that there is a central depression 42 provided with depressions 43 and 44 on the respective sides thereof. In this form, when the plate 28 is suitably presented to the roller 35, the roller 35 may retain the plate 28 in any one of three positions, namely a central position when the roller 35 rests in the depression 42 or a rocked position when the roller rests in either one of the depressions 43 or 44. The fourth or front side of the cam plate 28 in the position indicated is herein shown as having a smooth contour. This edge is left in this shape in order that it may be formed to give any other desired action that may be required. For example, this edge may be formed where the switches are to be carried in one normal position removed from the initial central positions, by cutting this edge to have a contour suggested by the dash lines in which case a depression 45 would appear at one end only with an inclined edge of the plate leading thereto.

Thus it is to be seen that a great number of variations may be introduced in the switching action by changing one or both of the switch positions on the base 11 through shifting of the clips; by changing the position of the lever 22 on the base; by shifting the cam plate 28 in reference to the lever 22 and also in reference to the base 11; and by changing the contour of the cam itself. It is understood of course that where the metal wall type of switch is employed, electrical leads 46 will be connected with the respective clips 15. A further variation in the switching action not above indicated is provided in this particular form, in that the switches 16 and 17 may in themselves be reversed in positions between the clips 15. That is one or both switches may be turned end for end so as to open a circuit instead of close or the reverse in the same rocking action of the base 11.

While I have herein shown and described my invention in the one form it is obvious that structural changes may be made without departing from the spirit of the invention, and I therefore do not desire to be limited to that precise form beyond the limitations as may be imposed by the following claims.

I claim:

1. In a mercury switch actuating device, a switch carrier member, means rockably supporting said member, a cam member, an operating member, said cam member being shiftably mounted in relation to said operating member in a plurality of positions, and said operating member being shiftably mounted in relation to said carrier member in a plurality of positions, means interlocking said carrier member, cam and operating member in any one of the shiftable positions thereof, and biasing means cooperating with said cam member determining positions of rest of said carrier member.

2. In a mercury switch actuating device, a switch carrier member, means rockably supporting said member, a cam member, an operating member, said cam member being shiftably mounted throughout a range of a plurality of positions around and relative to said carrier member, an operating member for rocking said carrier member, and biasing means cooperating with said cam member determining positions of rest of said carrier member, and means interlocking said cam, carrier member and operating member, whereby said operating member may rock the carrier member and the cam in opposition to said position determining means.

3. In a mercury switch actuating device, a switch carrier member, means rockably supporting said member, a cam member, an operating member, said cam member being shiftably mounted throughout a range of a plurality of positions around and relative to said carrier member, an operating member for rocking said carrier member, and biasing means cooperating with said cam member determining positions of rest of said carrier member, and means interlocking said cam, carrier member and operating member, whereby said operating member may rock the carrier member and the cam in opposition to said position determining means, clips mounted on said carrier member to receive a mercury switch therein, and means for shiftably positioning at least one of said clips whereby the inclination of the axis of the switch may be varied in relation to said carrier member.

4. In a mercury switch actuating device, a switch carrier member, means rockably supporting said member, a cam member, an operating member, said cam member being shiftably mounted throughout a range of a plurality of positions around and relative to said carrier member, an operating member for rocking said carrier member, and biasing means cooperating with said cam member determining positions of rest of said carrier member, and means interlocking said cam, carrier member and operating member, whereby said operating member may rock the carrier member and the cam in opposition to said position determining means, said cam in any of the selected positions having a contour for the action desired in the path of said biasing means, and said biasing means comprising a member spring pressed against said contour, whereby said spring pressed member will bear against a slope of said contour tending to rock the cam until it turns to allow the pressing member to come to rest in a depression in that contour.

5. A mercury switch tube rocking mechanism, comprising a switch carrier, an operating member, a cam member interconnecting with the carrier and said operating member, and a cam follower yieldingly pressed against the cam member for determining positions of rest thereon, said operating member being a carrier engaging end, pins extending from said end, and said carrier member having a plurality of sets of holes receiving said pins in selected positions of the operating member.

6. A mercury switch tube rocking mechanism, comprising a switch carrier, an operating member, a cam member interconnecting with the carrier and said operating member, and a cam follower yieldingly pressed against the cam member for determining positions of rest thereof, said operating member being a carrier engaging end, pins extending from said end, and said carrier member having a plurality of sets of holes receiving said pins in selected positions of the operating member, and pins between said cam member and said operating member arranged to position said cam member in any one of a plurality of positions, whereby a different cam contour may be presented to the follower.

7. In a mercury tube switch actuating mechanism, a support, a switch base, means rockably securing the base on the support, an operating member extending along the base, pin means extending between and interengaging the base and said member, a member having a peripheral cam face, pin means interengaging said base and said cam member, a cam follower in the path of said face, and means yieldingly carrying the follower against said face.

8. In a mercury tube switch actuating mechanism, a support, a switch base, means rockably securing the base on the support, an operating member extending along the base, pin means extending between and interengaging the base and said member, a member having a peripheral cam face, pin means interengaging said base and said cam member, a cam follower in the path of said face, and means yieldingly carrying the follower against said face, switch carrying clips on the base, and means variably spacing the clips from the center of rotation of the base.

9. In a mercury tube switch actuating mechanism, a support, a switch base, means rockably securing the base on the support, an operating member extending along the base, pin means extending between and interengaging the base and said member, a member having a peripheral cam face, said pin means also interengaging said cam member, a cam follower in the path of said face, and means yieldingly carrying the follower against said face, said pins being carried by said operating member and received by inner ends in holes in the base, said cam member being provided with holes to receive the outer ends of the pins.

10. In a mercury tube switch actuating mechanism, a support, a switch base, means rockably securing the base on the support, an operating member extending along the base, pin means extending between and interengaging the base and said member, a member having a peripheral cam face, pin means interengaging said base and said cam member, a cam follower in the path of said face, and means yieldingly carrying the follower against said face, said pins being carried by said operating member and received by inner ends in holes in the base, said cam member being provided with holes to receive the outer ends of the pins, the holes in said base and also in said cam member exceeding the number of pins whereby the operating member and cam member may be rotatably shifted about the base in relation to each other and the base.

JOSEPH H. STALEY.